Nov. 5, 1957   E. W. HAWKINSON   2,811,999
RIM FOR PNEUMATIC TIRE CASINGS
Filed March 22, 1956

INVENTOR.
Earle W. Hawkinson
BY
Merchant & Merchant
ATTORNEYS

United States Patent Office 2,811,999
Patented Nov. 5, 1957

2,811,999

RIM FOR PNEUMATIC TIRE CASINGS

Earle W. Hawkinson, Minneapolis, Minn., assignor to Paul E. Hawkinson Company, Minneapolis, Minn., a corporation of Minnesota Application March 22, 1956, Serial No. 573,216

1 Claim. (Cl. 152—413)

My invention relates generally to rims for pneumatic tire casings and more particularly to mounting rims of this type for use in precision buffing and/or tire truing equipment.

The primary object of my invention is the provision of a device in the class described wherein the mating rim sections may be axially aligned and accurately centered, one with respect to the other, so as to insure a maximum of accuracy in the buffing and truing of the pneumatic tire mounted thereon.

A still further object of my invention is the provision of a device in the class immediately above described which is not unduly expensive to produce, which is extremely easy and fool-proof in its operation, and which is rugged and durable in construction.

The above and still further objects of my invention will become apparent from the following detailed specification, appended claim and attached drawings.

Referring to the drawings, wherein like characters indicate like parts throughout the several views.

Figure 1:
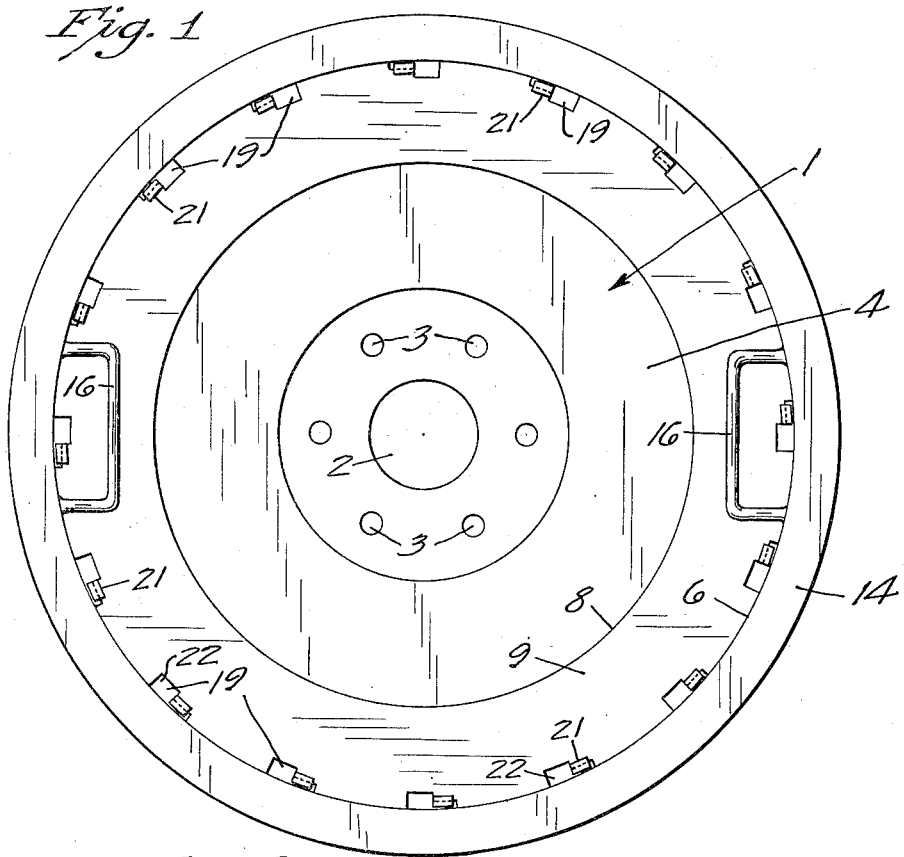
Fig. 1 is a view in side elevation of my novel rim construction.

Referring with greater particularity to the drawings, the numeral 1 indicates an annular wheel disc adapted for axial mounting on a suitable rotary hub structure, not shown, through the medium of a central opening 2 and a plurality of circumferentially spaced anchoring bolt receiving apertures 3. Wheel disc 1 includes inner and outer sides 4 and 5 respectively and a generally cylindrical marginal outer edge 6. The inner side 4 of said wheel disc 1 is provided with a generally radially extending annular seat 7 in the form of an annular rabbeted portion adjacent the outer marginal edge 6 thereof which extends inwardly therefrom and terminates in a generally cylindrical stop shoulder 8 radially inwardly from and concentric with the marginal edge 6. An annular coupling disc 9 is mated with and substantially coextensive with the annular rabbeted portion 7 of the wheel disc 1 and is snugly seated against the stop shoulder 8.

Figure 2:
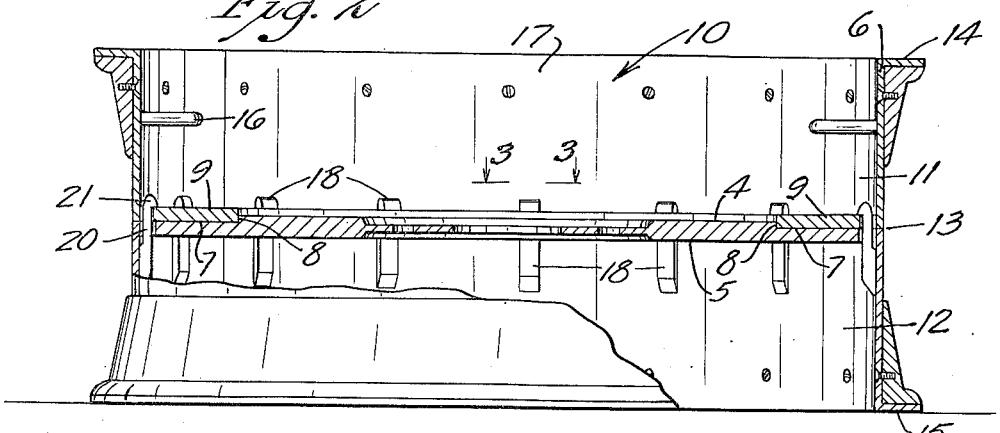
Fig. 2 is a view in side elevation, some parts being broken away and some parts being shown in section.
Figure 3:
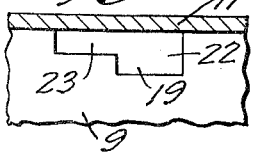
Fig. 3 is an enlarged fragmentary sectional view taken substantially on the line 3—3 of Fig. 2, some parts being removed.
Figure 4:
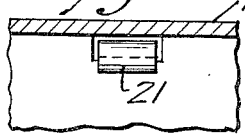
Fig. 4 is an enlarged fragmentary view in plan of a portion of the wheel flange.

A cylindrical tire mounting rim 10 comprises two similar cylindrical rim sections 11 and 12 adapted to be joined at their inner ends 13. Rim section 11 is provided with a radially outwardly projecting circumferentially extended tire bead engaging flange 14, whereas rim section 12 is provided with a similar flange 15 at its outer end. As shown, rim section 11 has its radially inner portion rigid with the radially outer marginal edge portion of the coupling disc 9, whereas rim section 12 has its radially inner portion rigid with the radially outer marginal edge portion 6 of the wheel disc 1. In this manner, the rim sections 11 and 12 may be accurately centered with respect to one another, merely by dropping the rim section 11 and the coupling disc 9 carried thereby downwardly upon the rim section 12 and the wheel disc 1 carried thereby, as shown in Fig. 2. Diametrically opposed handles 16 on the inner surface 17 of rim section 11 facilitate such maneuvering. The wheel disc 1 and the coupling disc 9 are substantially midway axially of the rim 10 and substantially in line with the inner ends 13 of the rim sections 11 and 12, as is apparent from Fig. 2.

Means for securely but detachably anchoring the coupling flange 9 to the wheel disc 1, while in the concentric position of Fig. 2, includes a series of circumferentially spaced bayonet locking lugs 18 rigid with the rim section 12 and the wheel disc 1 carried thereby, and extending generally axially therefrom each through a different one of a circumferentially spaced series of bayonet apertures 19 in the coupling disc 9. As shown, the lugs 18 comprise shanks 20 and enlarged head portions 21; and the bayonet apertures 19 comprise enlarged portions 22 for receiving the heads 21 of the lugs 18, and reduced portions 23 capable of receiving the lug shanks 20 but incapable of receiving the lug heads 21. Quite obviously locking or unlocking of the sections 11 and 12, and the discs 9 and 1 respectively carried thereby, is accomplished merely by turning the overlying rim section 11 to clockwise and counterclockwise, respectively, with respect to Fig. 1.

My invention has been thoroughly tested and found to be completely satisfactory for the accomplishment of the above objects, and while I have disclosed a preferred embodiment thereof, I wish it to be specifically understood that same is capable of considerable modification without departure from the scope and spirit of the appended claim.

What I claim is:

A tire mounting wheel structure comprising, in combination, a pair of cooperating abutting cylindrical rim sections of equal diameter each having a generally radially outwardly projecting annular bead-engaging flange, one of said sections having a plurality of circumferentially equi-distantly spaced guide-acting locking fingers each disposed substantially parallel to the axis of the rim sections and projecting axially inwardly away from the flange on said one section and terminating in a free end portion having a transverse groove facing radially inwardly of said rim, a wheel disc attached to and extending radially inwardly from and substantially normal to said one section, said wheel disc having an axially offset rabbeted portion adjacent the outer marginal edge thereof, the other of said sections having an annular coupling disc projecting radially inwardly and disposed substantially normal to the axis of the rim sections, said coupling disc being disposed within said rabbeted portion in engagement with said wheel disc to guide and center said sections on assembly thereof, said coupling disc further having a plurality of circumferentially equi-distantly spaced openings, said openings each having enlarged and reduced end portions defining radially outwardly extending locking lugs, each of said openings being axially aligned with one of said fingers with the enlarged portion of each opening initially receiving the free end portion of the respective locking finger and providing for limited rotary movement of the rim sections relative to each other when said sections are assembled and disassembled, with each of the fingers engaging a portion of the radial inner surface of the other cylindrical section and with each groove receiving the locking lug of the respective opening when said sections are in cooperating rim-forming relationship, said rim sections being of substantially equal axial length and said wheel disc and said coupling disc being located substantially midway between the bead-engaging flanges when said sections are in cooperating rim-forming relationship.

References Cited in the file of this patent

UNITED STATES PATENTS

| | | |
|---|---|---|
| 2,124,773 | Frank | July 26, 1938 |
| 2,308,959 | Brink | Jan. 19, 1943 |
| 2,480,578 | Hodges | Aug. 30, 1949 |